United States Patent [19]

Robinson

[11] Patent Number: 5,415,847
[45] Date of Patent: May 16, 1995

[54] TREATMENT OF PIT WASTE CONTAINING CHROMATED COPPER ARSENATE

[75] Inventor: Marguerite Robinson, Malvern, Ark.

[73] Assignee: Gem, Inc., Malvern, Ark.

[21] Appl. No.: 79,710

[22] Filed: Jun. 22, 1993

[51] Int. Cl.⁶ ............... C01G 3/00; C01G 28/00; C01G 37/00
[52] U.S. Cl. ................................. 423/27; 423/87; 423/53; 210/913
[58] Field of Search ............ 588/231; 423/87, 27, 423/53; 427/440, 297; 210/913

[56] References Cited

U.S. PATENT DOCUMENTS

| | | | |
|---|---|---|---|
| 3,787,306 | 1/1974 | Senior et al. | 423/144 |
| 3,911,078 | 10/1975 | Nadkarni et al. | 423/87 |
| 3,948,802 | 4/1976 | Liddell | 252/404 |
| 4,240,826 | 12/1980 | Kangas et al. | 75/738 |
| 4,241,039 | 12/1980 | Koh et al. | 423/87 |
| 4,244,735 | 1/1981 | Reynolds et al. | 423/87 |
| 4,244,927 | 1/1981 | Reynolds et al. | 423/87 |
| 4,369,164 | 1/1983 | Monk | 423/87 |
| 4,526,687 | 7/1985 | Nugent | 588/900 |
| 4,610,723 | 9/1986 | Nogueira et al. | 423/87 |
| 4,671,882 | 6/1987 | Douglas et al. | 423/55 |
| 4,878,945 | 11/1989 | Raudsepp et al. | 428/87 |
| 5,002,748 | 3/1991 | Jones et al. | 423/87 |
| 5,024,769 | 6/1991 | Gallup | 210/721 |
| 5,106,510 | 4/1992 | Rieber | 210/717 |
| 5,137,640 | 8/1992 | Poncha | 423/87 |
| 5,141,753 | 8/1992 | Virtanen et al. | 423/87 |
| 5,262,063 | 11/1993 | Yen | 423/87 |

OTHER PUBLICATIONS

Windandy, J. E., "Precipitation of CCA Solution for Waste Disposal," The Int. J. Wood Preserv., 3(2), 1983, pp. 83–88.

*Abstract* from Ei Compendex Plus (TM) #01598472 EI Monthy No: EI8412139916 E. I Yearly No. EI84139170 Winandy Publication "Precipitation of CCA Solutions for Waste Disposal" 1984.

*Primary Examiner*—Steven Bos
*Attorney, Agent, or Firm*—Stephen D. Carver; Trent C. Keisling

[57] ABSTRACT

A chemical process for treating pit waste contaminated with chromated copper arsenate (i.e. CCA). CCA is recovered for recycling, and remaining solids are decontaminated for safe disposal. Pit wastes are pulverized and reacted with concentrate sulfuric or phosphoric acid. Wood particles are partially decomposed and approximately 60% to 70% of the CCA is leached out. The acid-treated mixture is centrifuged or filtered to separate liquids from solids. Liquids are recycled for reuse in the CCA process. CCA-bearing solids enter a heated digester equipped with an air or water cooled condenser. Concentrated nitric and sulfuric acids are inputted into the digester and the ratio of nitric acid to sulfuric acid to solids is approximately six to two to one by volume. Nitric acid completely oxidizes all organic matter in the solids. Sulfuric acid serves as a dehydrating agent and liquid media for CCA. The initial oxidation is carried out at a temperature greater than 70° C. and less than 100° C. In the final stage of oxidation nitric acid is reacted and passed off as lower nitrogen oxides between 100° C. and 110° C. Recovered nitric acid may be recycled to the instant process.

6 Claims, 1 Drawing Sheet

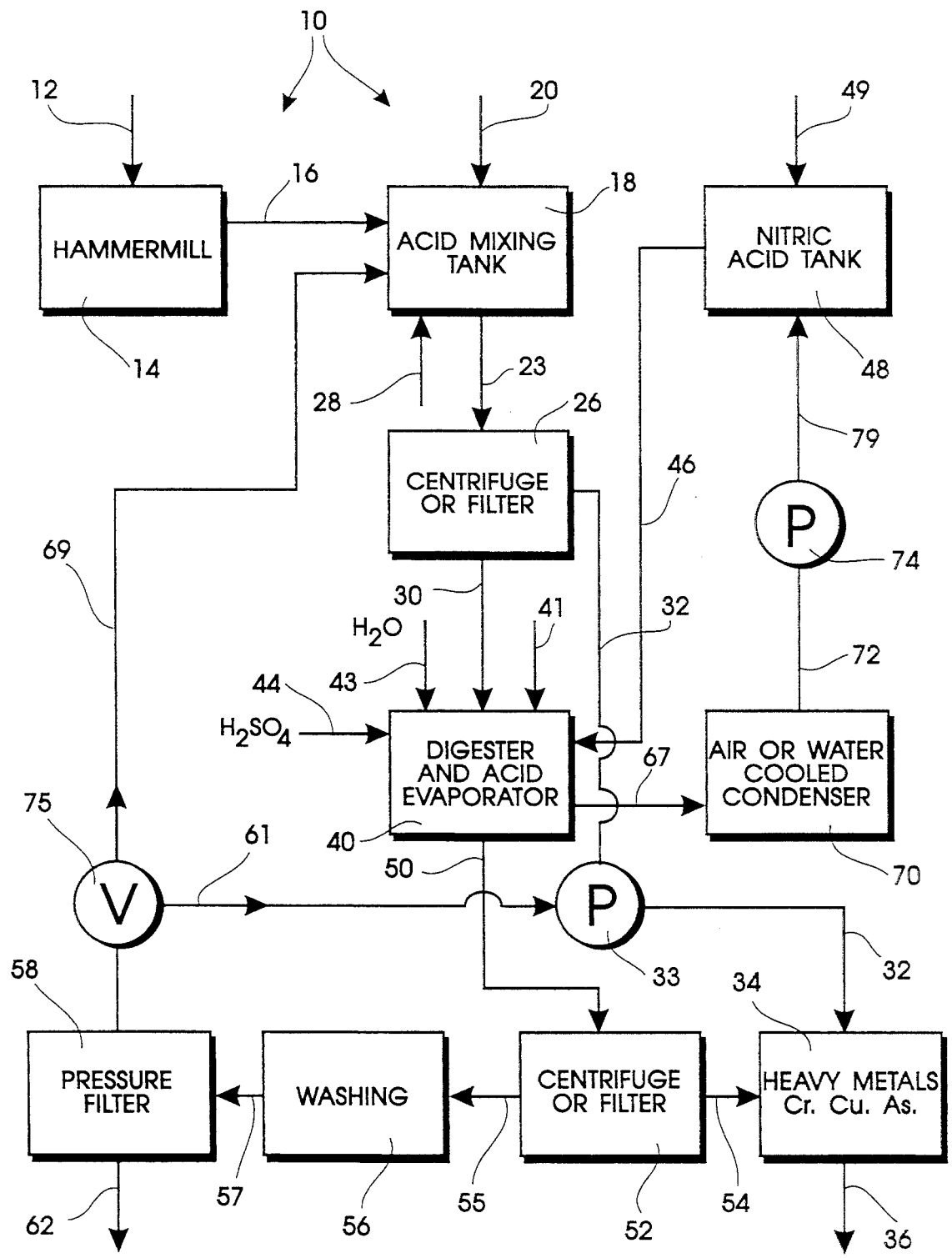

TREATMENT OF PIT WASTE CONTAINING CHROMATED COPPER ARSENATE

BACKGROUND OF THE INVENTION

My invention relates broadly to processes involving the removal of contaminants from pit wastes. More particularly, the present invention relates to a process for the treatment of waste products generated by wood preserving plants that employ chromated copper arsenate (CCA).

Chromated copper arsenate is used as a wood preservative in a variety of processes. Wood products impregnated with Chromated Copper Arsenate solutions are resistant to decay and deterioration, and they are substantially immune from moisture and water induced degradation. CCA-treated wood products are resistant to decay when the wood is in contact with the ground or water. Pit wastes and byproducts from the process are also resistant to water, making it difficult to treat them for environmentally safe disposal.

In conventional CCA pressure treating processes, wood products are inserted into a pressure vessel that is then flooded with a liquid chromated copper arsenate solution and pressurized for a predetermined time. The CCA solution is eventually forced into the pores of the wood. The unused solution is thereafter pumped from the vessel. A partial vacuum is then induced in the vessel to remove excess CCA solution from the wood. Wood products removed from the vessel are allowed to drip-dry for a predetermined time. The drippings from freshly treated wood products are collected by a curbed concrete slab and routed to a concrete pit. There the drippings are filtered, and wastes are screened out. The recovered CCA-bearing liquid is returned to the preserving process for further use.

Dirt, concrete particles, wood and various other materials build up in the pit. Pit wastes collected during chromated copper arsenate (CCA) wood treatment comprise a mixture of dirt, pieces of wood, and miscellaneous organic and inorganic substances. These pit wastes contain chromated copper arsenate, and they must be removed from the pit from time to time. Presently, these waste products are removed to hazardous waste landfills by the manufacturers of chromated copper arsenate. These wastes are stored in fifty-five gallon drums, and at the present rate of wood treatment there are approximately 5,000 such drums stored in hazardous waste landfills each year in the United States.

It is well known in the art to leach arsenic bearing compounds and dissolve them with sulfuric acid. The adjustment of pH can occur with a variety of bases and acids. Recycling material back in to a parent process is also well known in the art.

Numerous U.S. patents deal with neutralization or disposal of the elemental components used in the aforedescribed process. U.S. Pat. No. 4,244,927 teaches the recovery of an arsenic compound involving "leaching" and liquid-solid separations and filtering. This method employs sulfuric acid as a leaching agent.

U.S. Pat. No. 5,141,753 also teaches leaching and neutralization of metallic substances with sulfuric acid. It is specifically directed to a copper-arsenic precipitate produced from refining copper during the production of arsenic bearing preservatives for wood treating. Neutralization occurs with lye.

U.S. Pat. No. 4,532,044 discloses a process that removes arsenic fluids with spent oil shale. U.S. Pat. No. 4,948,516 shows a method of disposing of wastes wherein arsenate is involved. U.S. Pat. No. 5,137,640 shows the recovery of arsenic precipitates from solutions of arsenic salts and sulfuric acid. U.S. Pat. No. 4,241,039 discloses a method of removing arsenic, wherein sulfuric acid is also used as a preliminary reagent. U.S. Pat. No. 4,240,826 is a very complicated process for handling arsenic. In U.S. Pat. No. 3,911,078 arsenic compounds are precipitated out of a reaction with sulfuric acid.

Chemical leaching and arsenic solutions are disclosed in U.S. Pat. Nos. 4,610,723, 5,024,769, and 4,244,735. U.S. Pat. No. 4,369,164 shows the recovery of copper and arsenic from solutions. U.S. Pat. No. 5,045,115 shows a system for treating solid waste residues. U.S. Pat. No. 5,106,510 shows the combined filtration and dissolving of metals. U.S. Pat. No. 3,948,802 shows a method of recycling and saving materials during wood processing. U.S. Pat. No. 4,526,687 shows how pit waste treatments can involve recirculation and recovery of materials.

The known prior art simply fails to disclose a workable process to remove chromated copper arsenate from contaminated solids. It is thus desirable to provide a process for decontaminating pit waste cellulosic products impregnated with chromated copper arsenate.

Hence, it is desirous to provide a process wherein pit waste from the CCA treatment of wood can be reduced to non-hazardous waste material that is fit for environmentally safe disposal. It is further desired that the chromated copper arsenate reclaimed for reuse. Such a process must be amenable to the treatment of soils or other solids contaminated with chromated copper arsenate resulting from accidental spills. The process should yield material having less than five parts per million of elemental compounds containing chromium, copper, or arsenic.

SUMMARY OF THE INVENTION

I have developed a process for treating contaminated pit waste of the type generated during conventional chromated copper arsenate wood treatment. During pit waste treatment in accordance with the process, chromated copper arsenate is recovered for recycling, and solid pit wastes are decontaminated for environmentally safe disposal.

The wastes are subjected to a two phase acid process. In the preferred embodiment, the first phase utilizes concentrated sulfuric acid to partially decompose the waste and leach out chromated copper arsenate. In an alternative embodiment, phosphoric acid replaces the sulfuric acid in the first phase.

The second phase of both embodiments utilizes a mixture of nitric and sulfuric acid. The nitric acid is a strong oxidizing agent that completely oxidizes all organic matter contained in the waste. The sulfuric acid serves as a dehydrating agent and media for the chromated copper arsenate. The process second phase uses a mixture of concentrated industrial sulfuric acid and nitric acid. The remaining solids after complete oxidation are 98% to 99% silica.

In the first phase incoming waste material is pulverized into a fine powder, preferably capable of passing a number twenty sieve. The pulverized wastes are reacted with concentrated acid. Sulfuric or phosphoric acids are preferred. The preferred ratio of acid to solids is two to one by volume. All wood particles are partially decomposed, and approximately 60% to 70% of the chromated copper arsenate impregnated in the wood is leached out.

The acid-treated resultant mixture is centrifuged or filtered to separate liquids from solids. Solids are discharged, and liquids are recycled for the CCA wood treating process.

In the second phase separated solids enter a heated digester equipped with an air or water cooled condenser. Concentrated nitric and sulfuric acids are inputted into the digester and the ratio of nitric acid to sulfuric acid to solids is approximately six-to-two-to-one by volume. Nitric acid serves as the oxidizing agent and must be sufficient to completely oxidize all organic matter in the solids. Sulfuric acid serves as a dehydrating agent and liquid media for the chromated copper arsenate.

The initial oxidation is carried out at a temperature greater than 70° C. and less than 100° C. The preferred temperature for the final stage of oxidation in which the last of the nitric acid is reacted and passed off as lower nitrogen oxides is between 100° C. and 110° C. The oxides of nitrogen evolved are converted back to nitric acid for reuse in the process. The resultant mixture is centrifuged and/or filtered to separate liquids from solids and the liquids are returned for reuse in the CCA wood treating process. Solids are washed with water and the resulted wash water is returned to the CCA process.

Through laboratory analysis the level of chromated copper arsenate in the solids is determined. If the solids still contain appreciable amounts of chromated copper arsenate, they may be recycled back into the instant process. Decontaminated solids are outputted for proper disposal.

Hence it is a fundamental object of the present invention to provide a method for the removal of chromated copper arsenate from waste products generated by wood preserving plants.

A basic object is to purify CCA pit waste.

Another basic object is to provide an environmentally safe method whereby chromated copper arsenate may be recovered and recycled.

Another basic object is to treat accidentally contaminated material such as soil.

Another fundamental object is to break down CCA pit waste that would otherwise be sent to hazardous waste landfills, so that the cellulosic waste can be disposed of in nonhazardous landfills.

A still further object is to overcome the resistance to washing and leaching of CCA-treated waste products.

In other words, it is an important object to decontaminate pit wastes accumulated during wood product treatment with chromated copper arsenate.

It is an additional object of the present invention to provide a method whereby solids from typical CCA preserving processes are rendered free of chromated copper arsenate.

A related object is to provide a process capable of greatly reducing the volume of contaminated material otherwise generated by typical CCA treatment centers.

These and other objects and advantages of the present invention, along with features of novelty appurtenant thereto, will appear or become apparent in the course of the following descriptive sections.

BRIEF DESCRIPTION OF THE DRAWING

The following drawing, that forms a part of the specification and which is to be construed in conjunction therewith, is a block schematic diagram of the best mode of my pit waste treatment process.

DETAILED DESCRIPTION

With reference now directed to the accompanying drawing, my process for treatment of pit waste containing chromated copper arsenate is generally designated by the reference numeral 10. These wood wastes result from wood-preserving processes that employ chromated copper arsenate (CCA). Such wood preserving processes are hereinafter referred to as "CCA processes." In my new process 10 pit wastes accumulated during the pressure treatment of wood products are decontaminated, and chromated copper arsenate is recovered and returned to the normal CCA process.

The waste or other contaminated material to be processed is inputted through conveyor 12. In this step large volumes of contaminated material or pit waste are inputted into a conventional hammermill 14. The hammermill pulverizes the material into a fine powder, preferably capable of passing a number twenty sieve. The pulverized wastes are conveyed in step 16 to an acid mixing tank 18.

The acid mixing tank 18 is a large vat or commercial reactor, preferably a glass-lined vessel. Concentrated sulfuric or phosphoric acid is inputted in this first phase from source 20. The 96% to 98% industrial sulfuric acid is preferred. In the second embodiment this first phase can substitute 85% phosphoric acid. The acid is added to the wastes until a liquid-to-solid ratio of two-to-one (by volume) is obtained. The mixture is maintained at ambient temperature and stirred occasionally. The wastes are subjected to a time based reaction with the acid for a minimum of three hours. The wood particles are partially decomposed and 60% to 70% of the chromated copper arsenate impregnated in the wood is leached out.

Next, water is added to the mixture via line 28, preferably at a ratio of one-to-one by volume. The resultant mixture is conveyed via step 23 to a centrifuge or filter 26. The liquid and solids are separated. Solids are outputted through conveyer 30 and liquids are discharged through pipe 32. Separated liquids in pipe 32 are returned to the heavy metal retort 34 by a pump 33. The CCA and acid mixture within retort 34 can be drawn off on line 36 to be recycled to the normal CCA wood treatment process.

In the second phase, the separated solids outputted through conveyor 30 enter digester 40 equipped with an air or water cooled condenser 70. Heat is provided to the digester, indicated schematically by line 41. Nitric acid is inputted through line 46 from nitric acid tank 48 and sulfuric acid is added through line 44. The ratio of nitric to sulfuric acid to solids is approximately six to two to one by volume. The temperature in the digester 40 is maintained greater than 70° C. but less than 100° C. during initial oxidation of the organic matter. The preferred temperature for the final stage of oxidation in which the last of the nitric acid is reacted and passed off as lower nitrogen oxides is between 100° C. and 110° C. Additional nitric acid may be added to obtain complete oxidation of all organic matter in the solids. Reaction time is dependent on the volume and mass of organic matter to be oxidized. The nitric acid fumes evolved are fumed off along line 67 and are cooled in an air or water cooled condenser 70 and nitric acid is reclaimed for reuse in the process. The reclaimed nitric acid is pumped through line 72 by pump 74 back into nitric acid tank 48 through pipe 79.

Water is added through line 43 to digester 40 until the sulfuric acid and solids remaining form a ratio of water to sulfuric acid of two-to-one. The diluted mixture is mixed thoroughly and transmitted through pipe 50 to a second centrifuge or filter 52. The mixture undergoes physical separation into solids and liquids. Liquid containing chromated copper arsenate is transmitted along line 54 to the retort 34 to reenter the associated CCA process. Solids are delivered via conveyer 55 to washing station 56. The solids are washed and the wash water and solids are outputted via pipe 57 to pressure filter 58. The liquid and solids are separated and the liquid is returned to the process mixing tank 18 via pipe 69 and valve 75. Liquid can also be transmitted through valve 75 and line 61 to pump 33 for transmittal to retort 34 via pipe 32.

Solids can be outputted from filter 58 via chute 62. The level of chromated copper arsenate in the remaining solids is then chemically determined. If the solids still contain CCA, they may be recycled back to the instant process. Decontaminated solids are outputted for proper disposal and may be classified as non-hazardous waste.

The following examples are merely illustrative and not intended to be construed as limiting application of the present method:

EXAMPLE 1

Pit waste containing chromated copper arsenate was treated by the above mentioned method and following results were obtained:

| Volume of pit waste before treatment | 390 milliliters |
| --- | --- |
| Reduction in volume | 66.15% |
| Weight of Pit waste before treatment | 500 grams |
| Weight of solids after treatment | 197.34 grams |
| Reduction in weight | 60.53% |

Concentration of Cr Cu and As remaining in the solids after treatment: Cr.<5 ppm; Cu<5 ppm; As<5 ppm.

EXAMPLE 2

Pit waste containing chromated copper arsenate was treated by the above mentioned method and following results were obtained:

| Volume of pit waste before treatment | 50 milliliters |
| --- | --- |
| Reduction in Volume | 68% |
| Weight of pit waste before treatment | 60 grams |
| Weight of solids after treatment | 20.23 grams |
| Reduction in weight | 66.30% |

Concentration of Cr Cu and As remaining in solids after treatment: Cr<5 ppm; Cu<5 ppm; As<5 ppm.

EXAMPLE 3

Pit waste containing chromated copper arsenate was treated by the above mentioned method and following results were obtained:

| Volume of pit waste before treatment | 50 milliliters |
| --- | --- |
| Reduction in Volume | 58% |
| Weight of pit waste before treatment | 30.97 grams |
| Weight of solids after treatment | 20.11 grams |
| Reduction in weight | 35.02% |

Concentration of Cr Cu and As remaining in solids after treatment: Cr<5 ppm; Cu<5 ppm; As<5 ppm.

EXAMPLE 4

A sample of peat moss (soil) was treated with the process. The solids had been contaminated as a result of an accident at a plant that produced CCA for the wood treating industries. The results are as follows:

| Volume of soil before treatment | 600 milliliters |
| --- | --- |
| Reduction in volume | 94.67% |
| Weight of soil before treatment | 205.54 grams |
| Weight of solids after treatment | 30 grams |
| Reduction in weight | 85.4 % |

Concentration of Cr Cu and As remaining in solids after treatment: Cr 6.21 ppm; Cu 9.05 ppm; As 8.15 ppm.

Although the total concentration is not less than five ppm., the volume of reduction is such that very little hazardous material would remain. The sample can be recirculated through the system for retreatment.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A process for removing chromated copper arsenate from a contaminated solid waste material, said process comprising the steps of:
    (a) pulverizing said solid waste material to form a powder;
    (b) combining said powder with concentrated sulfuric acid to form a first mixture;
    (c) reacting said first mixture for at least three hours to leach chromated copper arsenate from the powder and form an acid-treated resultant mixture;
    (d) adding water to said resultant mixture;
    (e) separating said mixture of step (d) into a liquid containing chromated copper arsenate and solids;
    (f) recovering said chromated copper arsenate of step (e);
    (g) combining said solids of step (e) with concentrated nitric acid and concentrated sulfuric acid to form a second mixture, said second mixture having a ratio by volume of 6:2:1 respectively for said nitric acid to said sulfuric acid to said solids;
    (h) digesting said second mixture at a temperature between 70° C. and 100° C. to completely oxidize said solids and form a digested mixture;

(i) adding water to said digested mixture;
(j) separating said digested mixture into a liquid containing chromated copper arsenate and solids;
(k) recovering the liquid of step (j);
(l) washing the solids yielded by step (j) with water to provide washed solids;
(m) pressing liquid from the washed solids to separate liquid from said washed solids and form pressed solids; and
(n) recovering the pressed solids.

2. The process as defined in claim 1 wherein said sulfuric acid of step (b) is added to said powder in a sufficient quantity to produce a two-to-one liquid to solid volumetric ratio.

3. The process as defined in claim 2 wherein water in said step (d) is added to said resultant mixture at a one-to-one volumetric ratio.

4. A process for removing chromated copper arsenate from a contaminated solid waste material, said process comprising the steps of:
   (a) pulverizing said solid waste material to form a powder;
   (b) combining said powder with concentrated phosphoric acid to form a first mixture;
   (c) reacting said first mixture for at least three hours to leach chromated copper arsenate from the powder and form an acid-treated resultant mixture;
   (d) adding water to said resultant mixture;
   (e) separating said mixture of step (d) into a liquid containing chromated copper arsenate and solids;
   (f) recovering said chromated copper arsenate of step (e);
   (g) combining said solids of step (e) with concentrated nitric acid and concentrated sulfuric acid to form a second mixture, said second mixture having a ratio by volume of 6:2:1 respectively for said nitric acid to said sulfuric acid to said solids;
   (h) digesting said second mixture at a temperature between 70° C. and 100° C. to completely oxidize said solids and form a digested mixture;
   (i) adding water to said digested mixture;
   (j) separating said digested mixture into a liquid containing chromated copper arsenate and solids;
   (k) recovering the liquid of step (j);
   (l) washing the solids yielded by step (j) with water to provide washed solids;
   (m) pressing liquid from the washed solids to separate liquid from said washed solids and form pressed solids; and,
   (n) recovering the pressed solids.

5. The process as defined in claim 4 wherein said phosphoric acid of step (b) is added to said powder in a sufficient quantity to produce a two-to-one liquid to solid volumetric ratio.

6. The process as defined in claim 5 wherein water in said step (d) is added to said resultant mixture at a one-to-one volumetric ratio.

* * * * *